United States Patent [19]

Grohmann

[11] Patent Number: 4,520,258
[45] Date of Patent: May 28, 1985

[54] SYSTEM CONCOMITANTLY CONTROLLING PASSENGER COMPARTMENT AND ELECTRIC AUXILIARY HEATING IN AUTOMATIC VEHICLES

[75] Inventor: Kurt Grohmann, Munich, Fed. Rep. of Germany

[73] Assignee: Bayerische Motoren Werke A.G., Munich, Fed. Rep. of Germany

[21] Appl. No.: 488,724

[22] Filed: Apr. 26, 1983

[30] Foreign Application Priority Data

Apr. 28, 1982 [DE] Fed. Rep. of Germany ....... 3215802

[51] Int. Cl.³ .......................... H05B 1/02; B60H 1/00
[52] U.S. Cl. ..................................... 219/279; 52/171; 165/41; 219/202; 219/203; 219/522; 237/12.3 B
[58] Field of Search ............... 219/203, 522, 547, 202, 219/279; 52/171; 165/41–43; 237/12.3 R, 12.3 A, 12.3 B

[56] References Cited

U.S. PATENT DOCUMENTS

| | | | |
|---|---|---|---|
| 3,440,398 | 4/1969 | Nilssen | 219/202 |
| 3,624,354 | 11/1971 | Heidorn | 219/522 X |
| 3,858,027 | 12/1974 | Phillips | 219/203 |
| 4,196,338 | 4/1980 | Edel | 219/203 |

FOREIGN PATENT DOCUMENTS

| | | |
|---|---|---|
| 668916 | 12/1938 | Fed. Rep. of Germany . |
| 2313428 | 9/1974 | Fed. Rep. of Germany ...... 219/202 |
| 2751563 | 5/1978 | Fed. Rep. of Germany . |
| 2039173 | 7/1980 | United Kingdom ................ 219/522 |
| 1570906 | 10/1980 | United Kingdom ................ 219/203 |

Primary Examiner—A. Bartis
Attorney, Agent, or Firm—Jerold M. Forsberg

[57] ABSTRACT

A heater arrangement for an automotive vehicle includes a switching arrangement having a conventional control device which is fed signals from sensors sensing the temperature outside of the vehicle, the temperature inside the vehicle, the temperature of the engine coolant, and the speed of the vehicle. A pulse sequence is generated for controlling a valve which in turn controls the flow of a heating medium to the heating system for heating the passenger compartment of the vehicle, the duration of the pulses in the sequence being varied in accordance with respective conditions. A frequency changer, timer and switch are disposed between an inverter and relay for concomitantly controlling an electric auxiliary heater on the vehicle, such as an electric rear window heater. The switching arrangement provides for switching of the auxiliary heater in conjunction with the switching of the control device for the heating system for the passenger compartment. In this way, separate circuit means for the auxiliary heater can be omitted, and operating convenience is facilitated and expenditure for circuit elements can be considerably reduced. At the same time, energy consumption for the auxiliary heater can be limited because of the auxiliary heater only being activated when needed.

13 Claims, 1 Drawing Figure

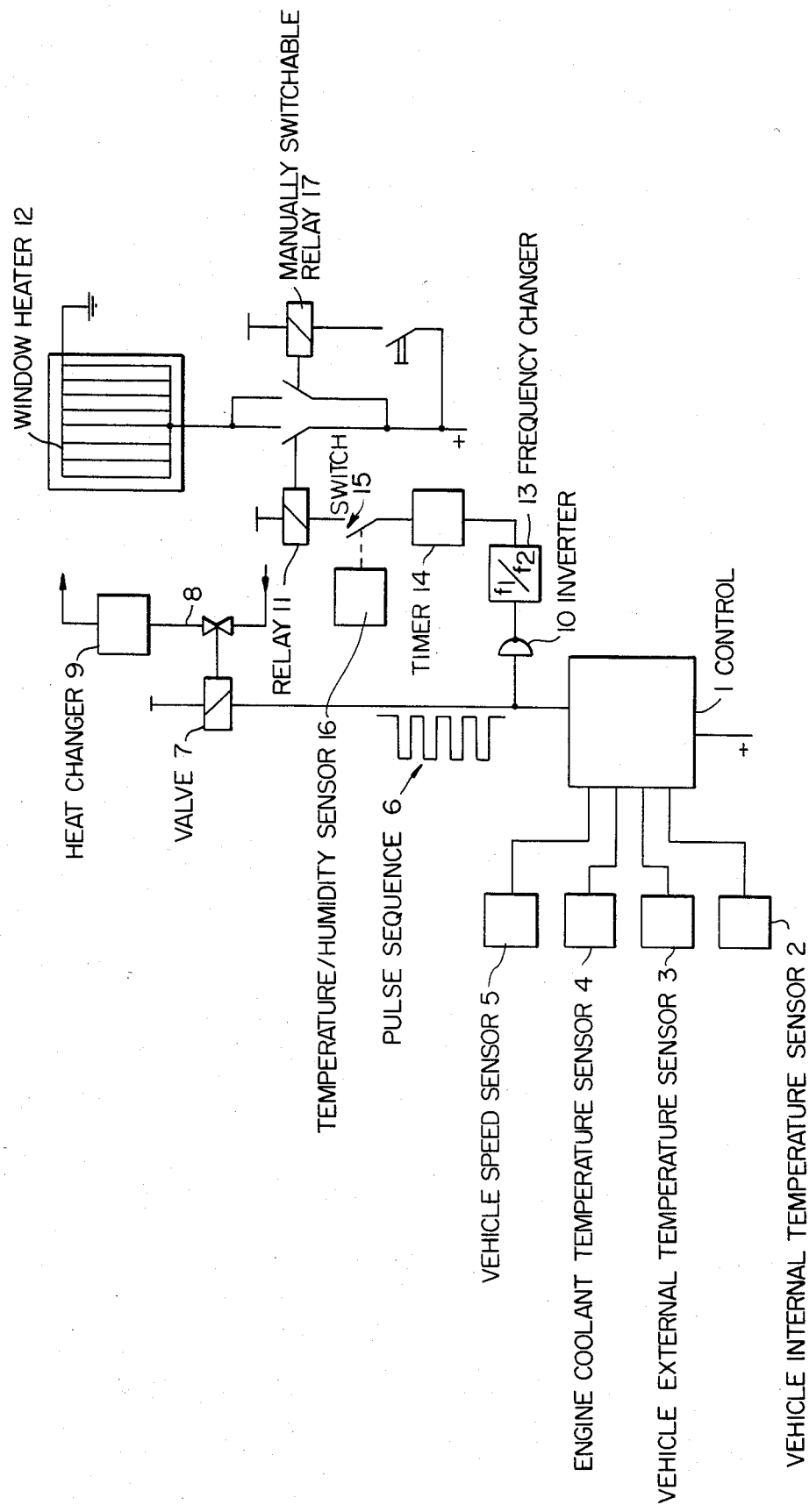

SYSTEM CONCOMITANTLY CONTROLLING PASSENGER COMPARTMENT AND ELECTRIC AUXILIARY HEATING IN AUTOMATIC VEHICLES

TECHNICAL FIELD

The invention relates to a switching arrangement for an electrical auxiliary heater in automotive vehicles, especially for the rear window thereof, with the vehicle having a heating means for the interior of the vehicle. The flow of heating medium of the heating means and the electrical auxiliary heater are turned on and off by a control device.

BACKGROUND ART

Auxiliary heaters are known and have been arranged in seats or outside mirrors of automotive vehicles. However, they are utilized most frequently in or on rear windows. In all cases, the problem exists of increasing operating convenience, while yet adapting the heating efficiency as optimally as possible to requirements for the auxiliary heater. Furthermore, too vigorous a heating action by the auxiliary heater is to be avoided in view of total energy balance and fuel consumption.

The timed starting of a window heater is shown by German Pat. No. 668,916. It is also shown by German Auslegeschrift 2,751,563 to control the rear window heater by a switching unit for a wiper and rinse system of the rear window. However, any kind of adaptation of the rear window heater to the internal and external conditions, e.g., the internal and external temperatures of the vehicle cannot be attained thereby. German Pat. No. 2,654,357 discloses activation of the rear window heater by a switch for a heater blower. None of these prior teachings suggest the conrol of an auxiliary heater in a manner and for the reasons as taught by the instant invention.

SUMMARY OF THE INVENTION

The invention involves a switching arrangement which solves the problems of controlling the activation of an auxiliary heater by activating the auxiliary heater with the same control device utilized to control the heating within the passenger compartment of the vehicle.

The invention is based on the concept that the extent of heating the passenger compartment and the required intensity of the auxiliary heater, under the usual operating conditions of the automotive vehicle, are in relation to each other. It is possible, by utilizing the instant invention, to employ the control device for the heating means for the passenger compartment concomitantly for controlling the auxiliary heater. Thus, the need for a separate circuit for the auxiliary heater is eliminated. In the ideal case, it is even possible to omit the usually present mechanical switch for the auxiliary heater, or a separate control unit therefor.

The controlling of the linking of heating means for the passenger compartment and the auxiliary heater can take place in various ways. Thus, activation or deactivation of the auxiliary heater can be effected simultaneously with the corresponding switching of the control which controls the heating of the passenger compartment. Thus it is possible to turn the interior heating means and the auxiliary heater on and off synchronously. In this way, additional switching means for the auxiliary heater can be entirely eliminated.

In the circuit for the auxiliary heater, the synchronous switching thereof with the heating means for the interior of the vehicle can be modified in various ways. In one alternative, there is the possibility of stepping down the frequency of activation of the auxiliary heater compared to the flow of heating medium. Furthermore, the total operating period of the auxiliary heater can be limited and optionally can be actuated again after the occurrence of several switching cycles controlling the flow of the heating medium.

The auxiliary heater operation of the invention can include varying the activating time of the auxiliary heater with respect to that of the flow of the heating medium. Besides turning on the auxiliary heater respectively for a constant time span within one or several switching cycles controlling the flow of the heating medium, the activating time for the auxiliary heater can be varied in correspondence with additional influencing factors. These influential factors can be the temperature and/or the moisture on the member carrying the auxiliary heater.

These and other objects, features and advantages of the present invention will become more apparent from the following description when taken in connection with the accompanying drawing which shows, for purposes of illustration only, one embodiment in accordance with the present invention.

BRIEF DESCRIPTION OF THE DRAWING

The sole FIGURE of the drawing shows one embodiment of the invention, and this embodiment is described in greater detail below.

DESCRIPTION OF THE INVENTION

The drawing shows a heating device for the interior of an automotive vehicle. It comprises, as the essential component, an electronic control device 1 which is fed with various information on internal and external conditions of the vehicle by for example, a vehicle internal temperature sensor 2, vehicle exterior temperature sensor 3 and engine coolant sensor 4. Additionally, a signal for the speed of the automotive vehicle is fed to control device 1 by a sensor 5.

The conventional control device 1 yields a pulse sequence 6 for controlling a conventional solenoid valve 7 which in turn controls the flow of the heating medium 8 through a passenger compartment heat exchanger 9 of the heating means for the interior of the vehicle. The pulses of the pulse sequence 6 are vaired in their duration in accordance with respective conditions. It is understood that the heating medium 8 is branched off from the engine cooling system in a conventional manner.

The pulse sequence 6, which switches the solenoid valve 7 in a timed manner, is fed, via a conventional inverter 10, to a conventional relay 11 for an electrical auxiliary heater, for purposes of illustration shown in the form of an electric rear window heater 12. Between the inverter 10 and the relay 11, matching members 13, 14 and 15 (explained in further detail later) can be provided in order to modify the activation and/or deactivation of the rear window heater 12 with respect to the controlled switching of the flow of heating medium 8, effected by the solenoid valve 7. These matching members can be, for example, a conventional frequency changer 13, a conventional timer 14, as well as a conventional controlled switch 15. The frequency changer 13 may, for example, transmit only every second or third switching pulse of the pulse sequence 6. The timer 14 automatically effects interruption of the pulse sequence 6 and thus deactivates the rear window heater 12 after a predetermined total operating period, and thereafter effects reactivation of the rear window heater in correspondence with a reactivation the heat exchanger 9 after a certain rest period. The controlled switch 15, finally, makes it possible to consider further influential factors for the rear window heater, for example, temperature and humidity, by the switch 15 being actuated by a conventional temperature and humidity control device 16. The length of the switching pulses 6 is constant or varied corresponding to the instantaneous conditions governing for the heating means of the passenger compartment of the vehicle.

However, in all cases, the rear window heater is turned on in correspondence with the heating means for the interior of the vehicle. If no matching members at all are included, such as the illustrated members 13, 14 and 15, the heating means for the interior of the vehicle and the rear window heater 12 are turned on and off simultaneously. This synchronization makes it possible to automatically switch the rear window heater 12 on without separate control means and be operated to the required extent and yet avoid any excessive load on the energy balance of the automotive vehicle. By the use of matching frequency changer, such as the illustrated members 13, timer 14 and switch 15, the synchronization is modified and adaptation of the rear window heater 12 to the heating means for the interior of the vehicle is optimized with small expenditure in circuitry.

It is, of course, also possible to turn on the rear window heater 12 separately, for example under extreme weather conditions; this can be accomplished, for example, by a manually switchable timer relay 17 connected in parallel with the relay 11.

While I have shown and described one embodiment in accordance with the present invention, it is understood that the same is not limited thereto but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A heater arrangement for an automotive vehicle, comprising a heating means for heating a passenger compartment of a vehicle, an auxiliary heater means for heating a portion of said vehicle, sensor means for sensing at least one condition influencing the heating of the passenger compartment, and control means for controlling said heater arrangement in response to said at least one sensed condition, said control means including means generating a pulse sequence in response to said at least one sensed condition and means responsive to said pulse sequence for controlling operation of said heating means, and means responsive to said pulse sequence for controlling operation of said auxiliary heater means.

2. A heater arrangement as set forth in claim 1, wherein said sensor means includes a plurality of sensors for sensing a plurality of conditions influencing the heating of the passenger compartment.

3. A heater arrangement as set forth in claim 1, wherein said at least one condition being sensed includes at least one of the engine coolant temperature, the vehicle internal temperature, the vehicle exterior temperature and the speed of the vehicle.

4. A heater arrangement as set forth in claim 1, wherein said auxiliary heater means is an electric heater.

5. A heater arrangement as set forth in claim 4, wherein said auxiliary heater means is a rear window heater.

6. A heater arrangement as set forth in claim 1, wherein said means responsive to said pulse sequence for controlling operation of said heating means includes a valve.

7. A heater arrangement as set forth in claim 1, wherein said means responsive to said pulse sequence for controlling said auxiliary heater includes a frequency changer and an inverter.

8. A heater arrangement as set forth in claim 1, wherein said control means simultaneously activates the auxiliary heater means and the heating means for heating the passenger compartment.

9. A heater arrangement as set forth in claim 1, wherein said control means simultaneously deactivates the auxiliary heater means and the heating means for heating the passenger compartment.

10. A heater arrangement as set forth in claim 1, including means for sensing additional conditions and controlling the auxiliary heater means in response thereto.

11. A heater arrangement as set forth in claim 10, wherein said additional conditions are associated with the portion of the vehicle heated by the auxiliary heater means and include one of humidity and temperature.

12. A heater arrangement as set forth in claim 1, including timer means for limiting the period of activation of the auxiliary heater means independently of the period of activation of said heating means for heating the passenger compartment.

13. A heater arrangement as set forth in claim 1, wherein said arrangement includes separate means for manual activation of said auxiliary heater means independent of activation of said heating means for said passenger compartment.

* * * * *